Patented Oct. 15, 1929

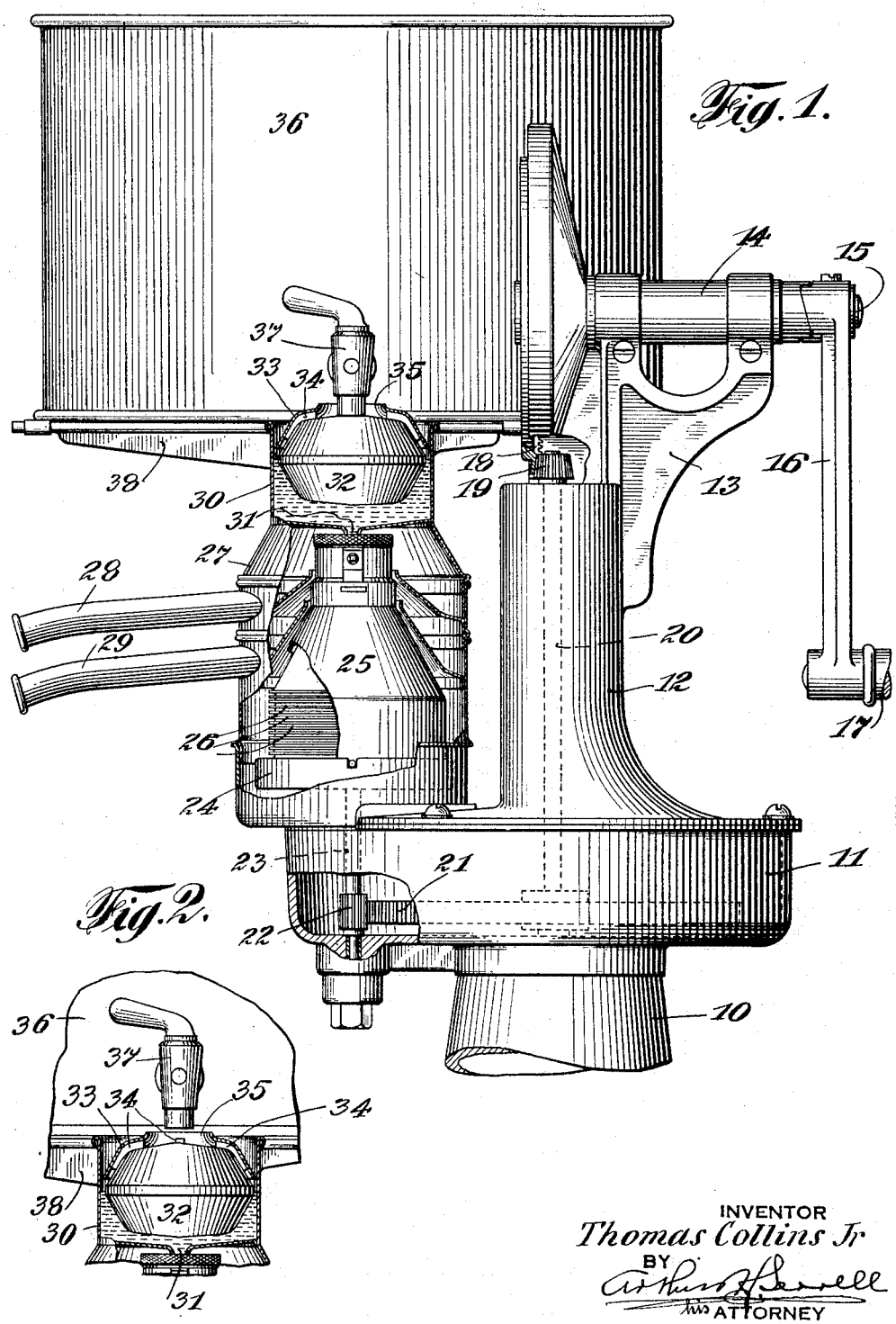

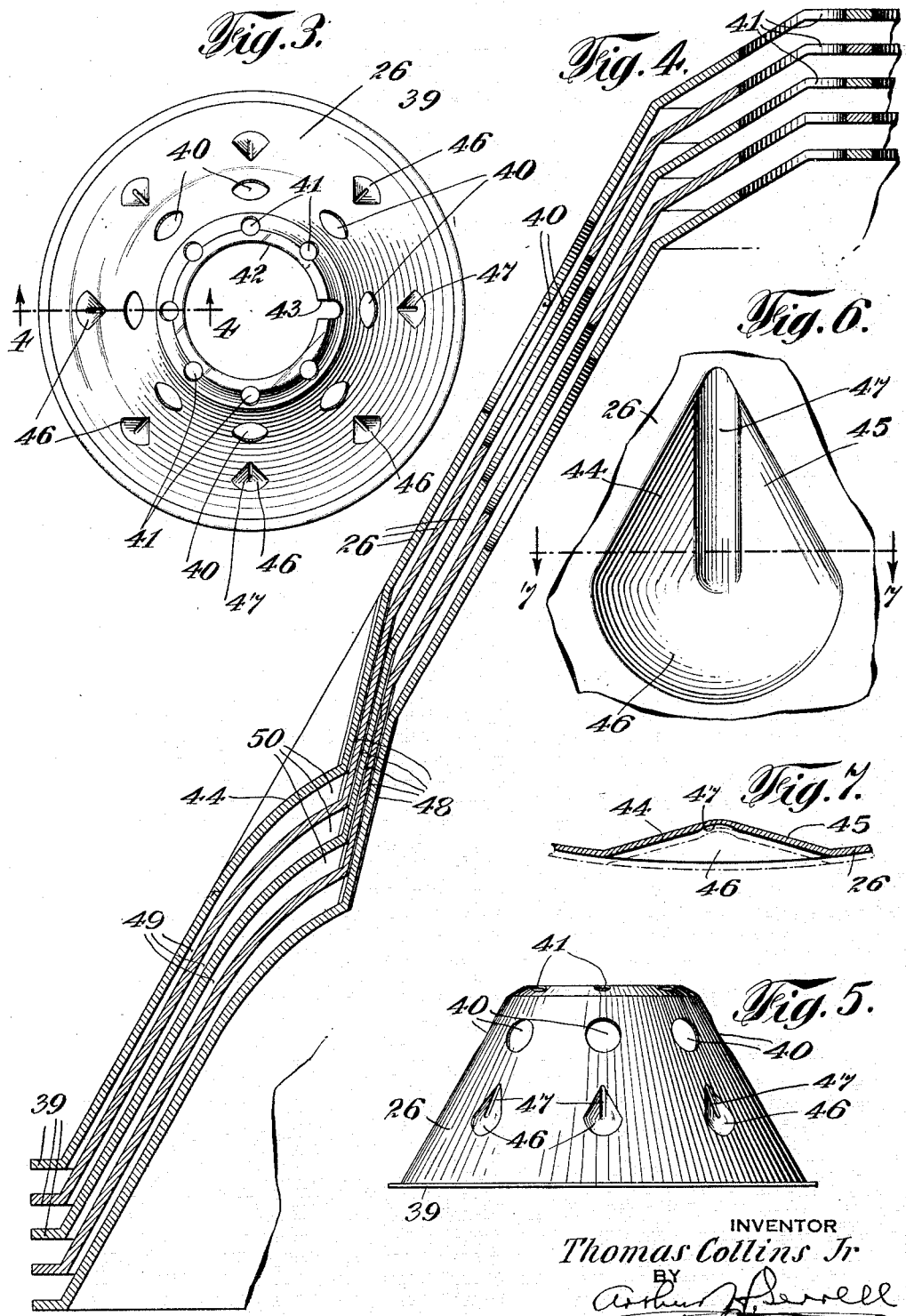

1,731,999

UNITED STATES PATENT OFFICE

THOMAS COLLINS, JR., OF BAINBRIDGE, NEW YORK, ASSIGNOR TO AMERICAN SEPARATOR COMPANY, OF BAINBRIDGE, NEW YORK, A CORPORATION OF NEW YORK

CREAM SEPARATOR

Application filed March 5, 1929. Serial No. 344,356.

My present invention relates to a cream separator which is an apparatus for separating the cream, or lighter, fatty constituents of milk, from the heavier, non-fatty constituents thereof. In cream separators it is customary to employ a separator bowl in which there are arranged nested liner discs which are preferably so placed as to have between each disc an appreciable space forming a passage for the cream and skimmed milk. Heretofore, as I am aware, the liner discs as used in cream separators have been so constructed as to effect the desired spacing thereof in various manners. It has been more or less common practice to construct these liner discs of sheet metal, either steel or other similar material, and to weld or otherwise connect lugs or bosses on the surfaces of the discs and to then plate the discs and lugs with tin or other material for effecting the desired spacing of the discs. When so constructed the liner discs are efficient and satisfactory until the tin plate, or other covering, is worn away, after which, obviously, there is a tendency for the material of which the liner discs and lugs are made to rust and this is decidedly objectionable. Moreover, due to the lactic acid in the milk the life of the tin plate as usually employed is relatively short so that oftentimes rust sets in before the apparatus has been in use for any appreciable period.

In an effort to overcome the objection to the formation of rust on the liner discs of a cream separator it has been proposed to utilize aluminum, or some other non-rust material in the manufacture of the discs. In the use, however, of any non-rust material of which I am aware it is difficult, if not impossible, to satisfactorily weld or otherwise connect spacer lugs in a sanitary manner on the surfaces of the discs and as the use of a non-rust material in making liner discs is a decided step forward in the art I have carried on various experiments to determine the most practical, as well as satisfactory manner of spacing the discs. In so doing I have provided each disc with a plurality of bosses each pressed outwardly so as to form a lug on the outer surface of the disc and a corresponding recess on the inner surface thereof, these lugs being so placed as to nest with each other when the liner discs are in position for use. In this structure the spacing of the discs is dependent on the thickness of the metal as well as on the angle at which the lug is formed relatively to the angle of the body of the disc. In this type of disc there are pockets formed beneath the contacting surfaces of adjacent spacer lugs which pockets are on the inner surfaces of the discs and consequently lie within the skimmed milk portions of the spaces between the liner discs. It has been found that curds and other more or less slimy substances being constituents of the skimmed milk accumulate in these pockets and make the cleansing of the discs more or less difficult for which reason this type of spacer lug is not practically satisfactory. Moreover, I have also found in the use of non-rust material that by depressing the lugs, that is, forming each lug so as to provide a boss on the inner surface of the disc with a corresponding depression in the outer surface of the disc, that the pockets formed by these lugs between the adjacent discs when nested are transferred from the skimmed milk portions to the cream portions of the spaces between the discs. In this structure the space between the discs is also dependent upon the thickness of the metal as well as the angle at which each lug is formed relatively to the angle of the body of the disc. I have found, furthermore, that by so forming the lugs and placing them adjacent the outer periphery of the discs the difficulty to which I have referred is overcome because naturally there is little cream formed between these parts of the discs and the cream which may be formed there will readily work along the inner surface of the lug toward the center, and by forming a groove in the outer surface of the lug a ready escape is provided for this cream. It will also be understood that in this manner of forming the spacer lugs there is no pocket for the accumulation of any of the ingredients in the skimmed milk and consequently the work involved in cleansing the liner discs when constructed with this improved form of spacer lug is greatly facilitated.

In the type of cream separator which I have illustrated and which is hereinafter more particularly described, I have employed an improved construction of the inlet or intake devices which include a shield associated with a float in the feed regulating cup to prevent the splashing and consequent loss of the milk as the same passes from a supply tank to the separator.

In the drawing Fig. 1 is an elevation and partial section of a cream separator in which my present invention is incorporated, Fig. 2 is a section and partial elevation of the feed regulating cup showing the float and shield in another position.

Fig. 3 is a plan of a liner disc made in accordance with my present invention,

Fig. 4 is a section on line 4—4, Fig. 3 the parts being shown on an enlarged scale, Fig. 5 is a side elevation of the improved liner disc, Fig. 6 is a plan illustrating the improved lug construction, and Fig. 7 is a section on line 7—7, Fig. 6.

In the type of cream separator as illustrated and as is customary a suitable support is employed and the upper end of which is indicated at 10 in Fig. 1. Suitably associated with the upper end of this support there is a gear case 11 extending upwardly from which there is a column 12. Connected to the column 12 there is a bracket 13 and in the bracket there is a bearing 14 for a shaft 15. Connected to the shaft 15 there is a crank 16 having a handle 17 by which the apparatus is operated. The shaft 15 carries a gear 18 which meshes with a pinion 19 carried by a shaft 20, which passes through and is suitably journaled in the column 12 and the housing 11. Mounted on the shaft 20 there is a gear 21 which turns with a pinion 22 carried by a bowl shaft 23. The bowl shaft is suitably journaled and connected to a bowl base 24 fitted with which is the usual bowl shell 25. Within the bowl there is a plurality of liner discs 26 which are commonly employed in apparatus of this type. Surrounding the bowl there is the usual casing 27 provided with a cream spout 28 and a skimmed milk spout 29 leading respectively from the cream chamber within the casing and the skimmed milk chamber within the casing.

The upper end of the casing 27 is constructed to include a feed regulating cup 30 in the base of which there is a port 31 leading to the inlet tube and distributor of the bowl. These parts may be constructed in any manner known to the art and per se form no part of my present invention. Within the feed regulating cup 30 there is a float 32. This is fitted with a shield 33. The shield 33 is preferably conical, and interiorly is provided with a series of ribs or lugs 34 which rest upon the upper surface portion of the float 32 in order to properly space the shield from the float while at its upper end of the shield 33 is provided with a rim 35 defining a centrally disposed opening therein. In the use of the apparatus a supply tank 36 is employed and this is adapted to normally rest upon a bracket 38 so as to permit the operator to swing the supply tank to and from a position in which its faucet or spigot 37 is in a position centrally disposed relatively to the inlet in the shield. In this structure it will be noted that the lower end of the faucet 37 terminates on a line which is substantially at the upper end of the feed regulating cup 30 so that when the supply of milk in this cup is low or exhausted and the float has descended therein, for example as illustrated in Fig. 2, the supply tank may be moved with the bracket 38 to a position in which the faucet does not interfere with the dismantling of the parts of the apparatus when this becomes necessary, and the lifting of the tank for this purpose is obviated. Also in this structure, as will now be appreciated, the milk as the same leaves the faucet 37 is directed through the aperture in the shield which causes the milk to flow over the float and beneath the shield to the feed regulating cup, thereby eliminating the splashing of the milk and any wasting of the same.

The invention in the instant case relates more particularly to the construction of the liner discs 26 which are illustrated in detail in Figs. 3 to 7 inclusive. In carrying out this invention each of these liner discs is preferably made of aluminum, stainless steel, or any other suitable and non-rust material. At the lower end each liner disc is flanged in the customary manner as indicated at 39. Adjacent the upper end of each disc there is a hole or port 40 for the passage of the whole milk while at the upper end of each disc there is an aperture or port 41 for the passage of the cream. The top of each disc, as illustrated, is provided with a centrally disposed circular opening 42 for the reception of the distributor of the bowl and the upper end of each disc is also notched, as indicated at 43, for the reception of a rib carried by the distributor of the bowl in order to insure the proper position of the disc within the bowl.

Each liner disc is preferably conical and in the outer portion thereof is provided with spacer lugs each comprising angularly disposed portions extending from the inner surface thereof and providing a corresponding depression or recess in the outer surface thereof. Each of these lugs is preferably so formed as to include portions pressed inwardly and having substantially flat outer faces 44 and 45 tapering downwardly and a curved portion 46 having a substantially spherical face, the said rounded portion merging with the angularly disposed portions and also with the adjacent portion of the body of the disc. It will be understood that these portions of each lug have corresponding inner faces on the inner side of the disc, the inner faces of the angularly disposed portions being flat and the face of the curved portion being concave. This type of spacer lug may be formed by means of a die or otherwise, and also as illustrated the depression in each lug is provided with a groove or channel 47 extending along the line at which the angularly disposed portions of the lug meet. The disc, as illustrated, is provided with eight of these lugs, and, of course, each disc in a set thereof is formed in the same manner. It will be understood, however, that any desired number of these spacer lugs may be employed and they may be located in any desired positions.

As clearly shown in Fig. 4 when these spacer lugs are nested the flat angular faces 44 and 45 on the outer surface of each disc contact with the corresponding faces on the inner face of the next adjacent outer disc thereby forming a complete line of contact between the liner discs which extends in a position substantially parallel to the axis of the liner discs and that this structure also provides for the channel 48 between each of these spacer lugs. The greater the thickness of the metal of which the discs are made and also the greater the angle at which each lug is formed relatively to the angle of the body of its disc the greater will be the distance or space 49 between the body portions of the discs. Also, inasmuch as the lugs are placed adjacent the outer portions of the liner discs there will be a relatively small proportion of the cream separated from the other constituents of the milk at the time the same reaches the pockets 50 in working its way upwardly but such cream as may form below the pockets will find an adequate escape through the channels 48 formed by the grooves 47. It will be observed, as indicated in Fig. 7, that these grooves 47 are formed at the angular line between the faces 44 and 45 by cutting away the metal or otherwise so that there is no corresponding projection on the inner surface of the disc. Still furthermore, it will be observed that in forming the spacer lugs as hereinbefore described there is no pocket formed in the inner surface of each disc for the accumulation of any residue of skimmed milk. Obviously the extent of the faces 44, 45 and 46 as well as the depth and position of the groove 47 may be varied as necessary to meet requirements in given instances for use and it will be understood that while I have illustrated and described the preferred construction of the apparatus the same may be varied to utilize other and equivalent constructions without departing from the nature and spirit of the invention, for example, the invention contemplates the construction in a liner disc of a lug which may have an arcuate or other configuration, as well as a substantially flat faced configuration as described, and furthermore the lug may be so made as to be annular, extending circumferentially entirely around the disc in which it is formed, in which structure, it will be understood that the engagement of the rib on the distributor in the notch 43 is relied upon solely to maintain the discs when nested in their revoluble positions.

From the foregoing it will now be understood that I have provided a practical, interchangeable, readily cleansable liner disc so constructed that the spacer lugs not only maintain the discs in their separated positions but also afford means for nesting the discs securely when in position for use.

I claim as my invention:

1. In a cream separator, a liner disc having a spacer lug formed therein to extend from the inner surface thereof to include substantially flat faces angularly disposed to one another and a substantially spherical face merging into the flat faces and the adjacent surface of the body of the disc, there being a groove at the meeting line of the angularly disposed faces of the lug.

2. In a cream separator, a liner disc having a spacer lug pressed from the body thereof to project from its inner surface and to provide a corresponding depression in its outer surface, the said lug having corresponding substantially flat faces angularly disposed to one another and substantially spherical faces merging with the corresponding ends of the flat faces and with the surface of the adjacent portions of the body of the disc.

3. In a cream separator, a liner disc having a spacer lug pressed from the body thereof to project from its inner surface and to provide a corresponding depression in its outer surface, the said lug having corresponding substantially flat faces angularly disposed to one another, and substantially spherical faces merging with the corresponding ends of the flat faces and with the surface of the adjacent portions of the body of the disc, there being a groove along the meeting line between the said angularly disposed flat faces in the outer surface of the disc.

4. In a cream separator, a plurality of liner discs adapted to be nested for use and each provided with a plurality of similarly placed spacer lugs, each spacer lug being pressed from the body of a liner disc to extend from the inner surface thereof and to comprise angularly disposed parts having substantially flat faces and a substantially spherical part merging with the parts having flat faces and the adjacent body portion of the liner disc, the inner faces of the angularly disposed parts of each lug being adapted to bear against the outer faces of the angularly disposed parts of a lug in the next adjacent liner disc when the liner discs are nested for use.

5. In a cream separator, a plurality of liner discs adapted to be nested for use and each provided with a plurality of similarly placed spacer lugs, each spacer lug being pressed from the body of a liner disc to extend from the inner surface thereof and to comprise angularly disposed parts having substantially flat faces and a substantially spherical part merging with the parts having flat faces and the adjacent body portion of the liner disc, the inner faces of the angularly disposed parts of each lug being adapted to bear against the outer faces of the angularly disposed parts of a lug in the next adjacent liner disc when the liner discs are nested for use, the junction between the said angularly disposed parts of the lug and the substantially spherical part thereof forming a pocket in the outer face of the liner disc, and there being a groove at the meeting line between the angularly disposed parts of the lug in the outer surface thereof.

Signed by me this 18th day of February, 1929.

THOMAS COLLINS, Jr.